Oct. 24, 1933.   A. C. BEARDSLEE ET AL   1,931,919
COMBINATION AXLE
Filed Aug. 3, 1932   5 Sheets-Sheet 1

Inventors
A. C. Beardslee
C. G. Clark

By Clarence A O'Brien
Attorney

Oct. 24, 1933.   A. C. BEARDSLEE ET AL   1,931,919
COMBINATION AXLE
Filed Aug. 3, 1932   5 Sheets-Sheet 3

Inventors
A. C. Beardslee
C. G. Clark
By Clarence A. O'Brien
Attorney

Oct. 24, 1933.  A. C. BEARDSLEE ET AL  1,931,919
COMBINATION AXLE
Filed Aug. 3, 1932   5 Sheets-Sheet 4

Inventors
A. C. Beardslee
C. G. Clark

By Clarence A. O'Brien
Attorney

Oct. 24, 1933. A. C. BEARDSLEE ET AL 1,931,919
COMBINATION AXLE
Filed Aug. 3, 1932  5 Sheets-Sheet 5

Inventors
A. C. Beardslee
C. G. Clark
By Clarence A. O'Brien
Attorney

Patented Oct. 24, 1933

1,931,919

UNITED STATES PATENT OFFICE 1,931,919

COMBINATION AXLE

Arthur C. Beardslee and Charles G. Clark, Arcade, N. Y.

Application August 3, 1932. Serial No. 627,360

4 Claims. (Cl. 295—8.5)

This invention relates to a combination axle, the general object of the invention being to provide a pair of wheels at each end of the axle with means for raising one wheel and lowering the other wheel to cause said other wheel to engage a road surface or track so that either wheel can be used, as desired.

This invention will permit a vehicle to travel either on a highway or on a railway, or one set of wheels can be made for ordinary highway travel and another set equipped with chains or lugs for better traction on soft ground.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
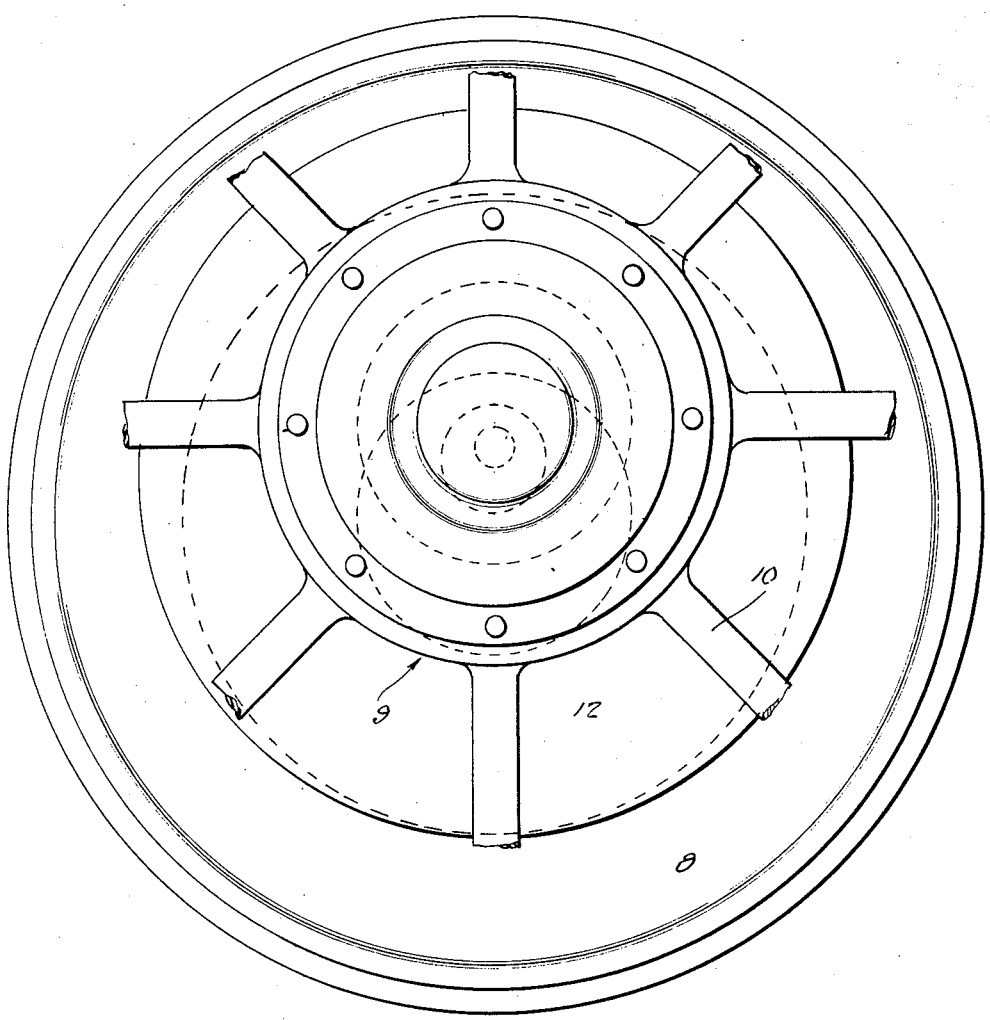
Figure 1 is a view looking towards a pair of wheels one of which is formed to travel upon the rail of a track, and the other, which is shown fragmentarily, may be formed to travel upon a highway.
Figure 9:
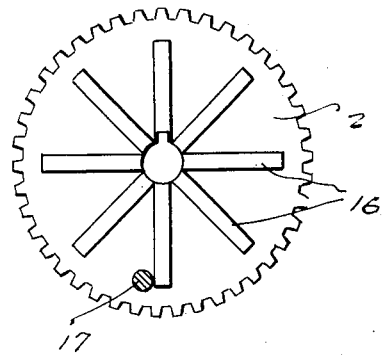
Fig. 9 is a view of the inner pinion with a projection on its inner face for engaging the spring actuated pin, said pin being shown in section.
Figure 2:
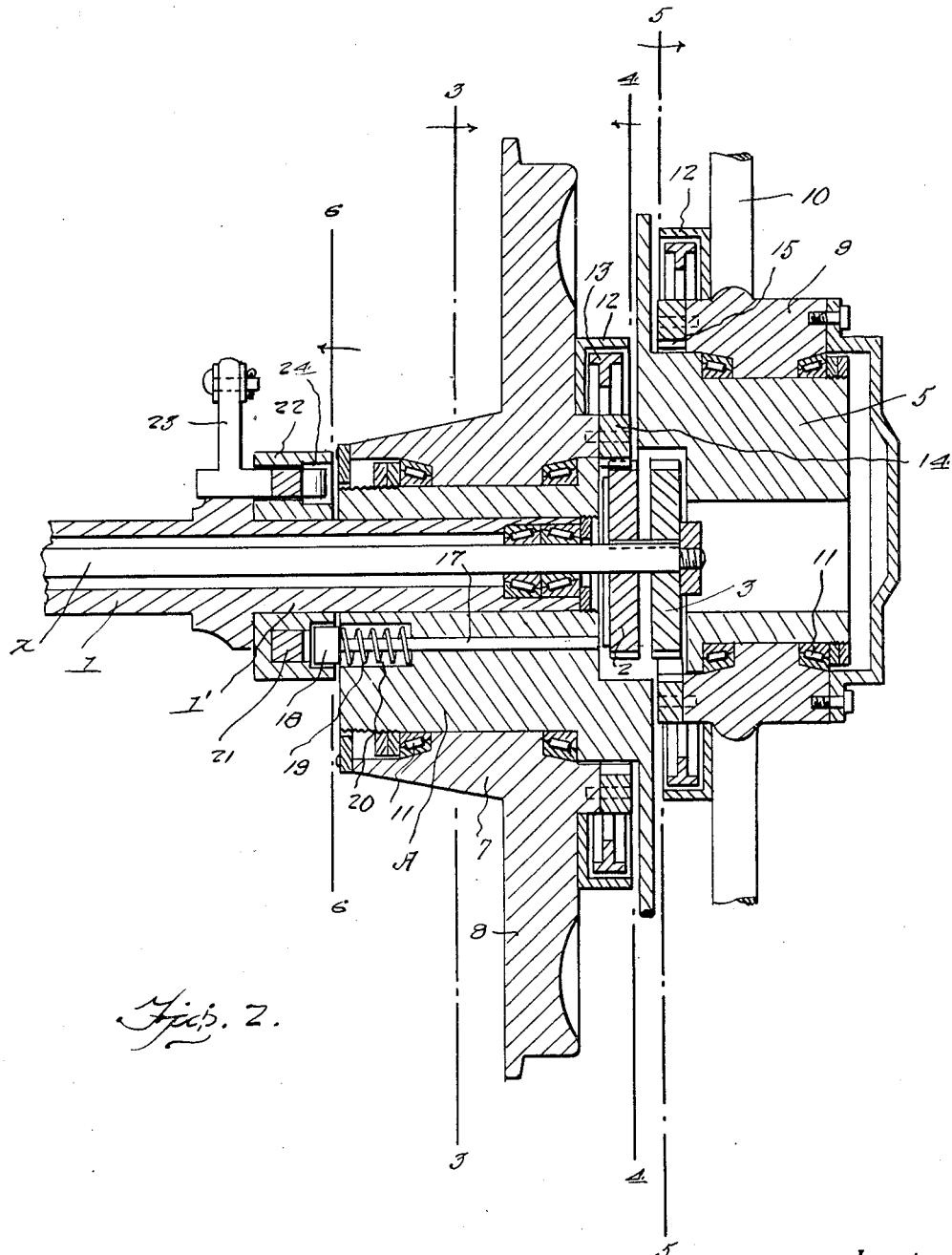
Fig. 2 is a sectional view through the device shown in Fig. 1.
Figure 3:
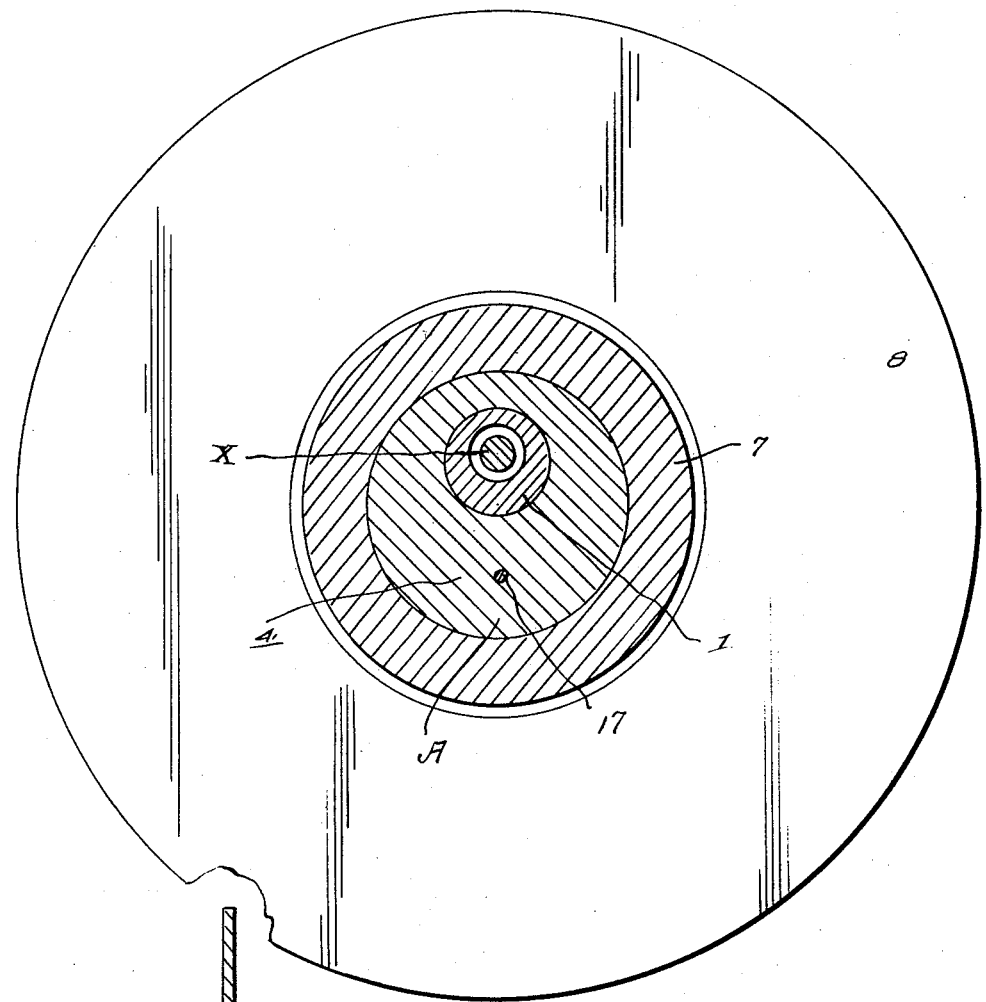
Fig. 3 is a section on line 3—3 of Fig. 2.
Figure 8:
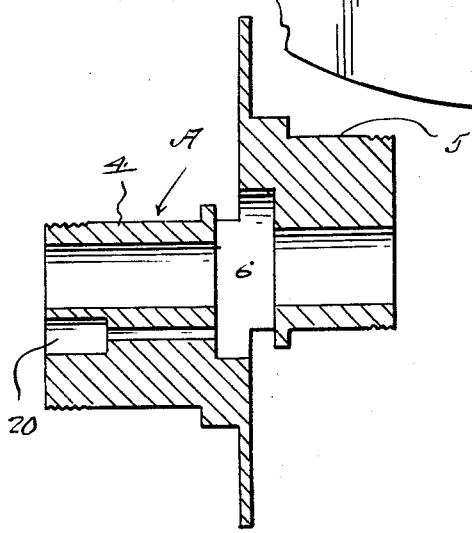
Fig. 8 is a sectional view through said member.
Figure 4:
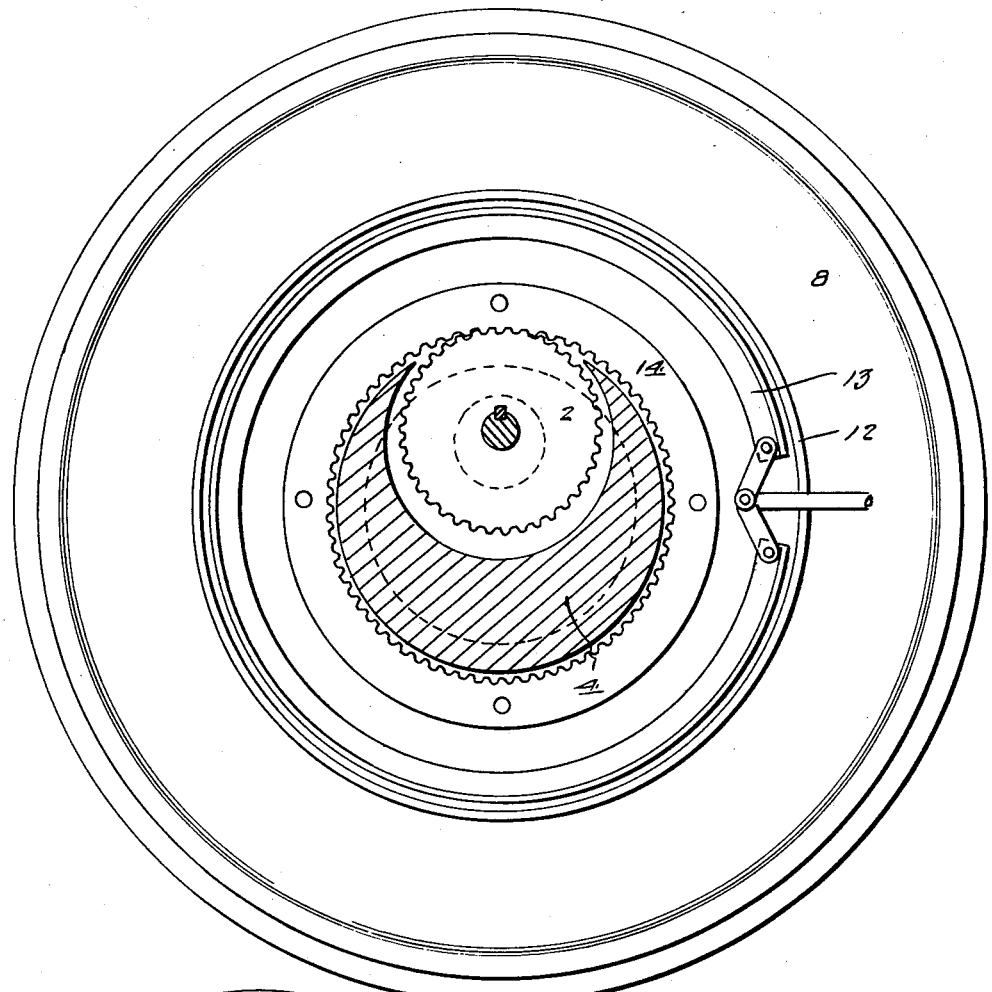
Fig. 4 is a section on line 4—4 of Fig. 2.
Figure 7:
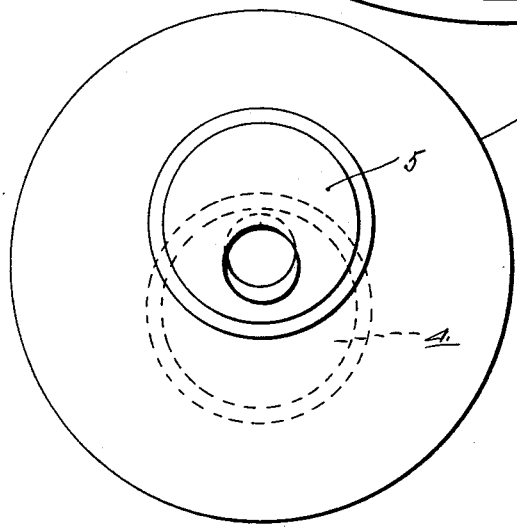
Fig. 7 is a view of the double eccentric member.
Figure 5:
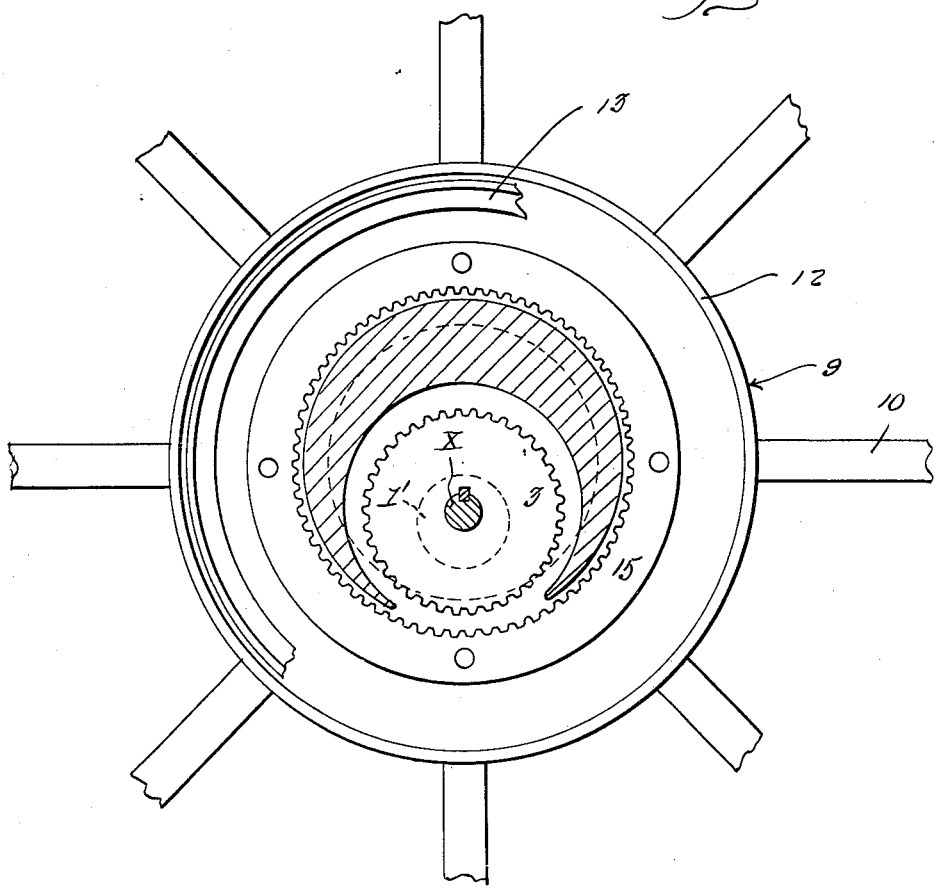
Fig. 5 is a section on line 5—5 of Fig. 2.
Figure 6:
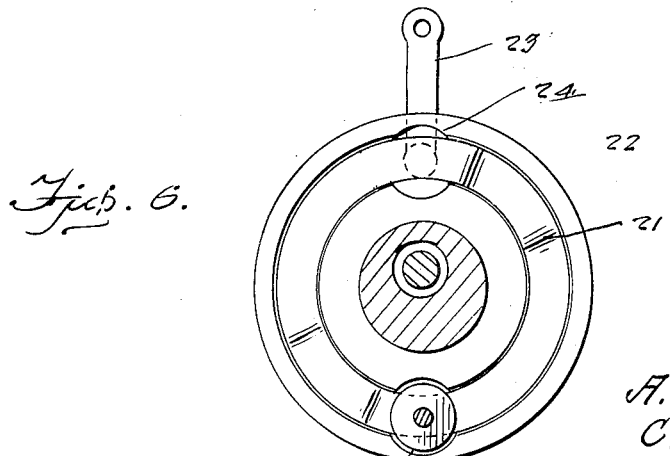
Fig. 6 is a section on line 6—6 of Fig. 2.

While the drawings show one of the wheels as formed to ride on the rail of a track and the other provided with spokes, it is to be understood that the wheels can be formed of other types, according to the purposes for which the vehicle is to be used.

In these drawings, the numeral 1 indicates a part of an axle housing which is formed with an eccentric portion 1' and the letter X indicates the drive shaft or axle passing through the housing and fastened at its outer end to the pinions 2 and 3. A double eccentric member A, composed of the inner and outer eccentric parts 4 and 5, is rotatably arranged on the eccentric portion 1' of the housing, and as will be seen, the parts 4 and 5 are diametrically opposite to each other and are offset in regard to the axis of the drive shaft or axle. The part 4 is rotatably arranged on the eccentric part of the housing with the part 5 extending beyond the end of the housing and a chamber 6 is formed between the two parts 4 and 5 in which the pinions 2 and 3 are located.

The hub 7 of the inner wheel 8 is rotatably arranged on the part 4 and the hub 9 of the wheel 10 is rotatably arranged on the part 5, suitable anti-friction means shown generally at 11 being provided for these hubs. Each hub is provided with a brake drum 12 for the brake member 13 and the outer end of the hub 7 carries a ring gear 14 for engagement with the pinion 2 and the inner end of the hub 9 carries a ring gear 15 for engagement with the pinion 3.

The inner face of the pinion 2 carries the radiating projections 16 and a pin 17 is slidably arranged in a longitudinal extension hole in the part 4 and when this pin 17 is projected its outer end will be engaged by one of the projections 16 so that movement of the pinion will be communicated to the double eccentric A to rotate the same on the eccentric part of the housing 1 so as to reverse the position of the double eccentric and thus move one wheel into inoperative position and the other wheel into operative position.

A head 18 is formed on the inner end of the pin 17 and a spring 19 encircles a part of the pin and is located in a socket 20 in the part 4. This spring engaging the head acts to hold the pin in retracted position with its outer end free of the projections 16 of the pinion 2. A cam ring 21 is rotatably arranged in a stationary annular member 22 surrounding a part of the housing 1 and this ring is actuated in any suitable manner, such as by an arm 23 connected to suitable means whereby an operator can move the same, so that the ring can be partly rotated to bring the high side thereof against the head 18 to project the pin, so that the pin will engage a projection 16 on the pinion 2 to cause the driving means to reverse the position of the member A and thus bring another wheel into operating position.

As the cam part of the ring 21 engages the head 18 of the pin 17 it will project the pin into engagement with a projection 16 on the pinion 2 and then as the eccentric member A starts to rotate the pin of the head will ride on the member 22 until it comes opposite one of a pair of recesses 24 in said member 22 and then the spring 19 will retract the pin and thus the double eccentric will come to rest and the pin with its head engaging the recess 24 will lock the parts in this position. The parts will remain in this position until the ring 21 is again operated to project the pin 17 again.

As will be seen when a wheel is raised by its part of the double eccentric, the ring gear of said wheel will be moved out of engagement with its pinion on the drive shaft so that said wheel will not be rotated and as the wheel is lowered, its ring gear will be moved into engagement with the pinion and thus the lowered wheel will be rotated. This movement of the ring gear into and out of engagement with its pinion results from the partial rotation of the double eccentric A on the eccentric portion 1' of the axle housing 1.

If the vehicle is travelling upon a railroad, for instance, and it is desired to change to a highway for instance, it is slowed up or stopped, the operating means connected with the ring 21 are actuated and the wheel shift made in low gear, after which the vehicle is accelerated in the usual manner.

By having the housing 1 eccentrically arranged to the drive shaft X with the double eccentric rotatably arranged on the eccentric housing, the vertical movement of the wheels is increased relative to the drive shaft X and the pinions 2 and 3 can be made larger than they could if the drive shaft X was arranged concentrically with the housing.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described our invention, what we claim as new is:—

1. A device of the class described comprising a housing having an eccentric part at an end thereof, a drive shaft passing through the housing, a double eccentric including two oppositely arranged parts, the inner one of which is rotatably arranged on the eccentric part of the housing, a wheel hub rotatably arranged on each part of the double eccentric, a pair of pinions connected with the drive shaft, a ring gear carried by each hub and engaging one pinion of said pair when that part of the double eccentric which carries said hub is in lowermost position, and means for adjusting the double eccentric on the housing to bring either wheel into operative position.

2. A device of the class described comprising a housing having an eccentric part at an end thereof, a drive shaft passing through the housing, a double eccentric including two oppositely arranged parts, the inner one of which is rotatably arranged on the eccentric part of the housing, a wheel hub rotatably arranged on each part of the double eccentric, a pair of pinions connected with the drive shaft, a ring gear carried by each of the hubs and engaging one pinion of said pair when that part of the double eccentric which carries said hub is in lowermost position, and means for adjusting the double eccentric on the housing to bring either wheel into operative position, such means comprising a slidably arranged pin carried by the double eccentric, projections on one of the pinions, one of which is engaged by the pin when the pin is projected, and means for projecting and retracting the pin.

3. A device of the class described comprising a housing having an eccentric part at an end thereof, a drive shaft passing through the housing, a double eccentric including two oppositely arranged parts, the inner one of which is rotatably arranged on the eccentric part of the housing, a wheel hub rotatably arranged on each part of the double eccentric, a pair of pinions connected with the drive shaft, a ring gear carried by each hub and engaging one pinion of said pair when that part of the double eccentric which carries said hub is in lowermost position, means for adjusting the double eccentric on the housing to bring either wheel into operative position, such means comprising a slidably arranged pin carried by the double eccentric, projections on one of the pinions, one of which is engaged by the pin when the pin is projected, means for projecting and retracting the pin, such means consisting of a spring normally holding the pin in retracted position, and a stationary annular member having recesses therein and the pin having a head thereon for engaging the recess when retracted by the spring, and a rotary cam member in the annular member engaging the head of the pin for projecting the same, said pin when its head engages the recess, acting to lock the parts in adjusted position.

4. A device of the class described comprising a housing, a drive shaft passing through the housing, a double eccentric having two oppositely arranged parts, the inner one of which is rotatably arranged on an end of the housing, a wheel hub rotatably arranged on each part of the double eccentric, a pair of pinions connected with the drive shaft, a ring gear carried by each hub and engaging one pinion of said pair when that part of the double eccentric which carries said hub is in lowermost position, and means for adjusting the double eccentric on the housing to bring either wheel into operative position.

ARTHUR C. BEARDSLEE.
CHARLES G. CLARK.